G. H. WHITTINGHAM & W. T. HOLMES.
PROTECTIVE DEVICE FOR ELECTRIC CIRCUITS.
APPLICATION FILED OCT. 15, 1915.
1,294,213.
Patented Feb. 11, 1919.
3 SHEETS—SHEET 2.
Fig. 2.
Fig. 3.
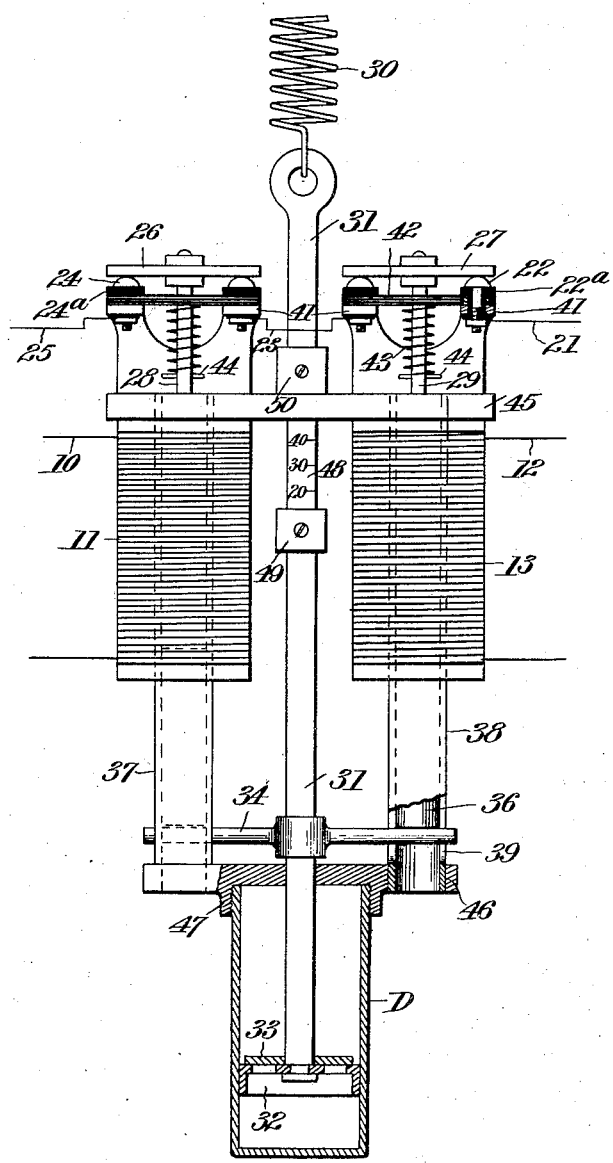
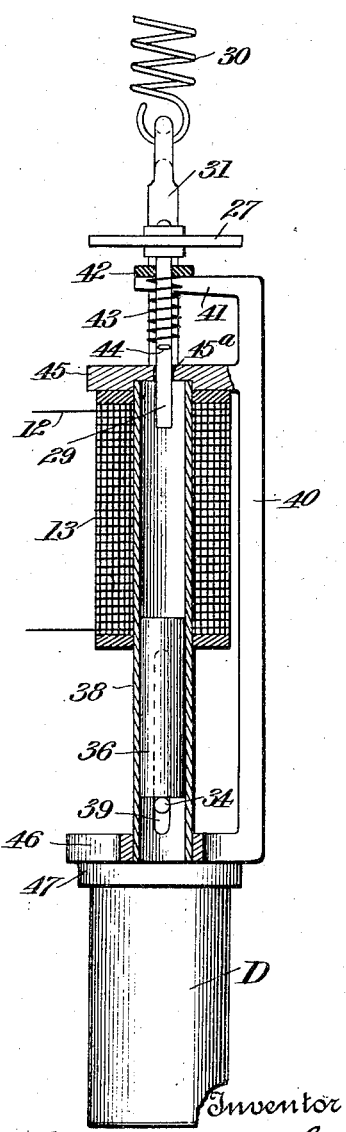
Inventor
George H. Whittingham,
and W<sup>m</sup> T. Holmes,
by Watson & Boyden,
Attorneys

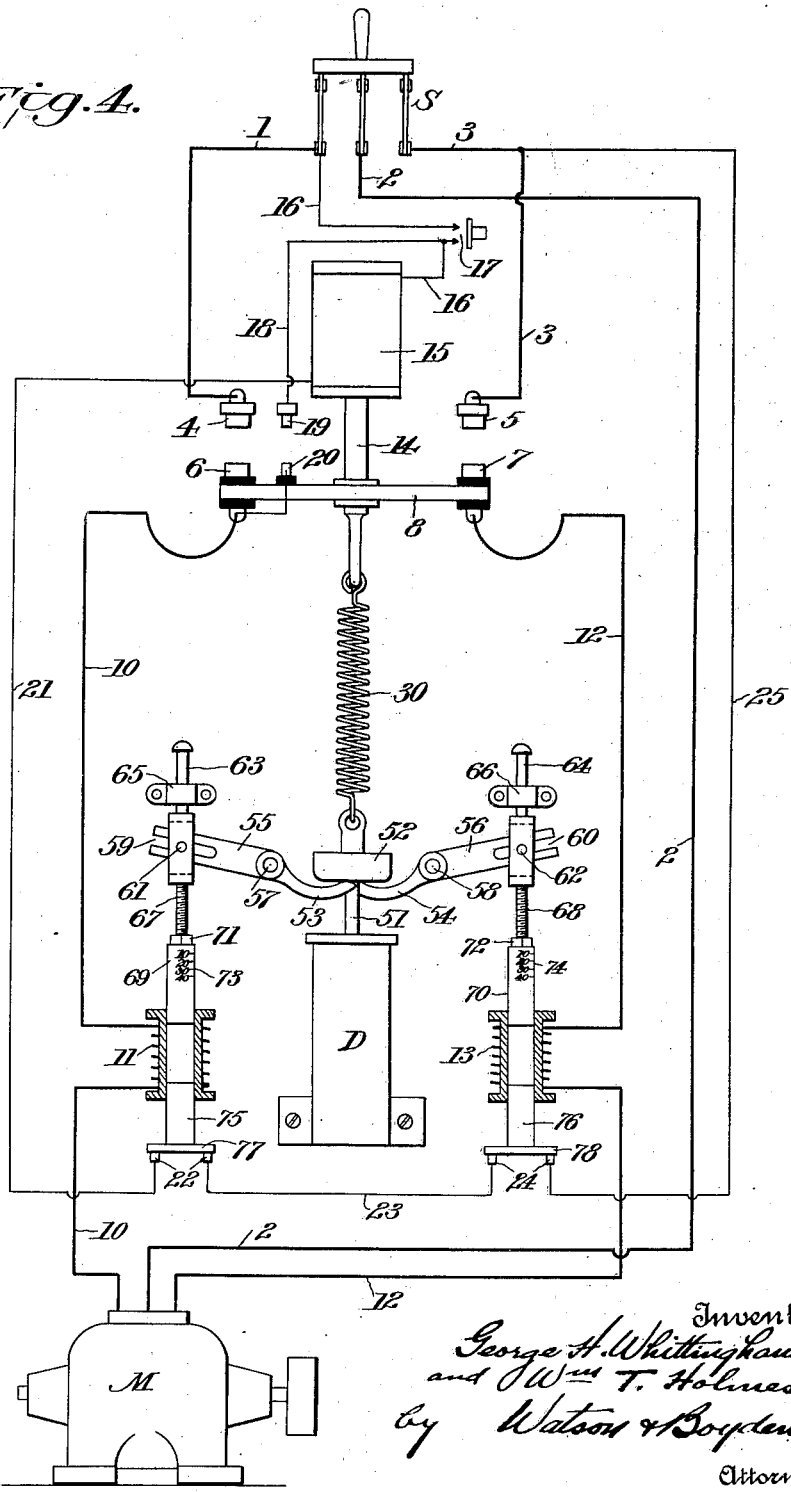

UNITED STATES PATENT OFFICE.

GEORGE H. WHITTINGHAM, OF BANCROFT PARK, MARYLAND, AND WILLIAM T. HOLMES, OF BALTIMORE, MARYLAND, ASSIGNORS TO MONITOR CONTROLLER COMPANY, OF BALTIMORE, MARYLAND, A CORPORATION OF MARYLAND.

PROTECTIVE DEVICE FOR ELECTRIC CIRCUITS.

1,294,213.    Specification of Letters Patent.    Patented Feb. 11, 1919.

Application filed October 15, 1915. Serial No. 56,011.

*To all whom it may concern:*

Be it known that we, GEORGE H. WHITTINGHAM and WILLIAM T. HOLMES, citizens of the United States, residing at Bancroft Park, in the county of Baltimore and State of Maryland, and Baltimore, in the State of Maryland, respectively, have invented certain new and useful Improvements in Protective Devices for Electric Circuits, of which the following is a specification.

This invention relates to protective devices for electric circuits, and its object is to automatically vary the sensitiveness of such a device a predetermined time after the closing of the circuit in which it is included.

More specifically the object of the invention is to produce a protective device or overload relay adapted for use in electric motor circuits, and to provide means for increasing the sensitiveness of such relay after the lapse of sufficient time to permit the initial rush of starting current to subside. By this means the device is unresponsive to the usual starting current, but becomes operative immediately after the expiration of the normal period of acceleration to effectively protect the motor against injury by overload.

In carrying out the invention, we provide means for varying the magnetic relation of the parts of the relay to increase its sensitiveness, as described. We also make provision for adjustably determining in advance the degree of sensitiveness which will be finally attained.

While in its broader aspects many features of the invention are capable of general application, the apparatus is especially designed for use in connection with alternating current motors of the polyphase type.

In order that the invention may be readily understood, reference is had to the accompanying drawings, forming a part of this specification, and in which, Figure 1 is a diagrammatic view showing one embodiment of our invention as applied to a 3-phase motor circuit;

Fig. 2 is a front elevation showing the details of construction of the overload relay illustrated in Fig. 1, parts being in section;

Fig. 3 is a vertical, transverse section through such relay, parts being in elevation; and, Fig. 4 is a view similar to Fig. 1, showing a somewhat different arrangement.

Figure 1:
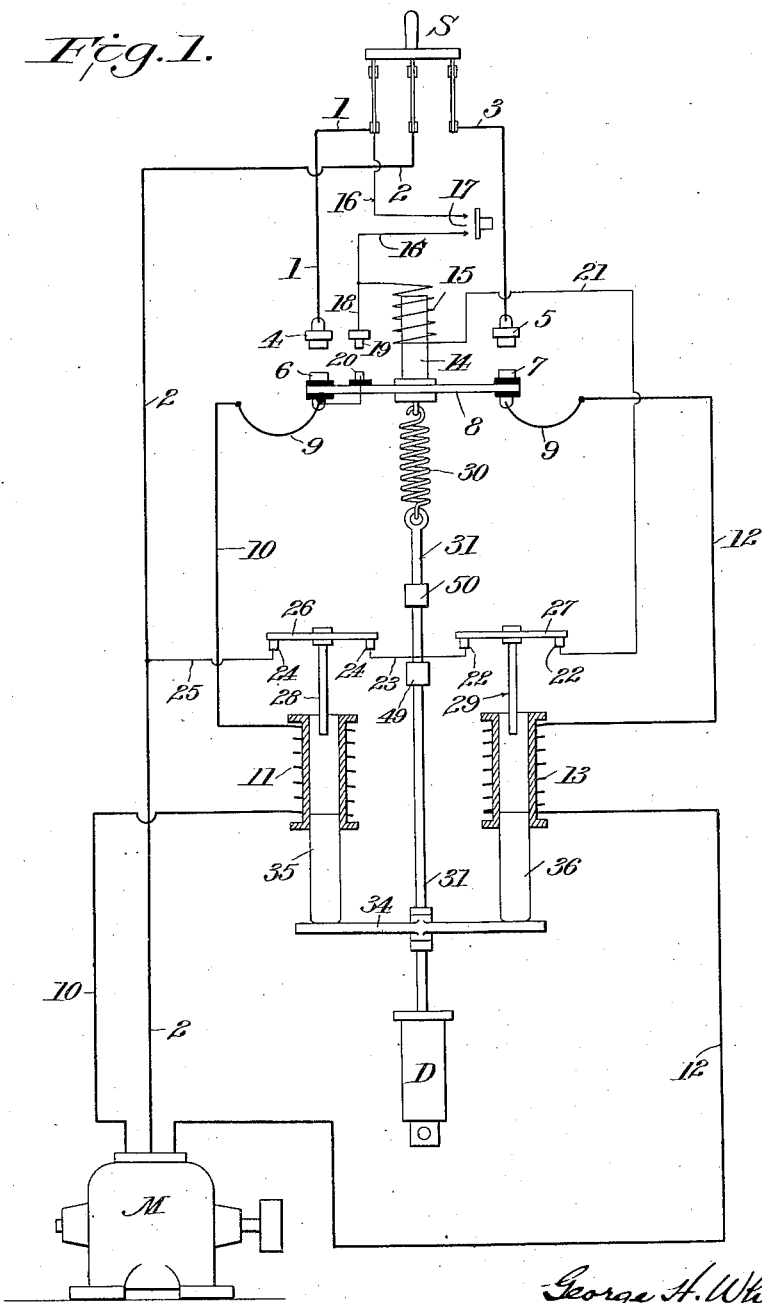

Referring to the drawings in detail, and particularly to Fig. 1, S represents a three-pole line switch of any desired construction, and to this switch are connected the three leads 1, 2, and 3, through which 3-phase current is supplied to the motor. This motor is indicated at M, and may be of any of the usual types.

The leads 1 and 3 are connected respectively to fixed contacts 4 and 5, adapted to be engaged by the corresponding contacts 6 and 7 of the main switch now to be described. This switch comprises a bar 8, on which the contacts 6 and 7 are mounted and from which they are insulated. The bar 8 is carried by the plunger 14 of a solenoid 15, by means of which the switch is actuated. The switch contacts 6 and 7 are connected by flexible leads 9 to conductors 10 and 12, respectively, which extend to the motor. Included in the conductors 10 and 12 are solenoid windings 11 and 13, respectively, these solenoids constituting parts of our improved protective device which we shall refer to as an overload relay.

In order to close the main switch above described, we connect one end of the solenoid 15 to one of the main motor leads, such, for example, as the lead 1, by means of a wire 16, a manual pilot switch 17 of the momentary contact type being interposed. The same end of the solenoid winding is also connected by the wire 18 to a contact 19, adapted to be engaged by an insulated contact 20, carried by the switch member 8 and electrically connected with the main contact 6.

The other side of the solenoid 15 is connected by a wire 21 to one of the other main motor leads, such, for example, as the lead 2. Interposed in this connection are two circuit breakers or auxiliary switches controlled by the overload relay. These switches preferably consist of disks 26 and 27, resting upon and bridging suitable contacts. The disk 26 bridges contacts 24, while the disk 27 bridges contacts 22. The wire 21 connects with one contact 22, while the other contact 22 is connected by a wire 23 with one of the contacts 24, the other contact 24 being connected to the lead 2 by wire 25. The switch disks 26 and 27 carry rods or stems 28 and 29, which project downwardly into the upper ends of solenoids 11 and 13.

A helical spring 30 is attached at one end to the switch member 8, and carries at its other end a vertical rod or bar 31, which extends downwardly between the relay coils 11 and 13 into a dashpot D. Referring to Fig. 2, it will be seen that this dashpot contains a piston 32, which is carried by the rod 31, such piston being provided with the usual valve 33, for checking the passage of fluid in one direction and thus retarding the upward movement of the piston and rod 31. A liquid such as oil or glycerin is used in the dashpot.

Secured to the rod 31, above the dashpot, is a cross bar 34, upon which loosely rest the lower ends of cores 35 and 36, of magnetic material, coöperating respectively with the solenoid coils 11 and 13.

Referring again to Figs. 2 and 3, it will be seen that these cores are in practice preferably contained within brass tubes 37 and 38 and are capable of sliding freely in such tubes. The tubes are provided with longitudinal slots 39, through which the ends of the cross bar 34 project.

All of the parts of the relay are preferably carried by a suitable bracket 40, having at its upper end a plurality of spaced arms 41, adapted to support the contacts 22 and 24. Each of the contacts 22 and 24 is, of course, insulated from its respective arm 41, by means of a suitable bushing such as 22$^a$ or 24$^a$. Each of the pairs of contacts 22 and 24 is spanned by a bar 42, of insulating material, such as hard fiber, and these bars have openings through which the stems 28 and 29 of the switch disks pass. Below the bars 42, each of the stems 28 and 29 is surrounded by a light helical spring 43, resting at its lower end on a cross-pin 44. It will be seen that the springs 43 tend to hold the disks in engagement with their respective contacts. The solenoids 11 and 13 are supported by means of a shelf 45, extending from the bracket 40 and provided with openings 45$^a$ through which the stems 28 and 29 freely pass, thus serving as guides for such stems.

The lower ends of the tubes 37 and 38 are held in a shelf 46, carried by the bracket 40, which shelf is provided with a central boss or enlargement 47, into which the upper edge of the dashpot D is secured.

Just below the point where it passes through the shelf 45, the rod 31 is provided with a scale 48 bearing numbers corresponding with current values in amperes. Adjustable over this scale is a block 49, secured to the rod 31 by means of a suitable set screw. This block may be clamped to the rod at any desired scale division, thus setting the relay to operate at any predetermined current value. A second block 50 is also adjustably mounted on the rod 31, above the shelf 45, and is adapted to engage such shelf to limit the downward movement of the rod 31 and associated parts.

The operation of our improved protective devices will now be described. In order to start the motor, the push button 17 is momentarily closed and this energizes the solenoid 15 over the following circuit: wire 16, solenoid 15, wire 21, contacts 22 and switch 27, wire 23, contacts 24 and switch 26, wire 25, to the lead 2. This causes the core 14 to be drawn up, thus bringing the contacts 6, 7, and 20 into engagement with the contacts 4, 5, and 19, respectively. The main motor circuit is thus closed through the conductors 10 and 12, the third conductor 2 being permanently connected with the switch S. The energization of solenoid 15 is now maintained through contacts 19 and 20 and wire 18, after the pilot switch or push button 17 has been released.

The upward movement of the switch bar 8 puts the spring 30 under tension and this causes the rod 31 and associated parts to begin a slow upward movement, retarded by the dashpot. After a predetermined time these parts will reach their final position, which position is limited by the engagement of the block 49 with the under side of shelf 45. When in their final position the cores 35 and 36 will have been projected to a certain definite extent into their respective solenoids 11 and 13.

In the initial position of the parts, the solenoid cores 35 and 36 are so far out of the solenoids that the usual rush of starting current is not sufficient to lift them. When, however, they have been projected into the solenoids to an extent determined by the position of the block 49, they will be lifted by any current in excess of that for which the device has been set. When so lifted, the cores will impinge against the ends of the stems 28—29 and thus lift the switch disks 26 and 27 from engagement with their respective contacts, thereby interrupting the circuit of solenoid 15 and permitting the main switch to fall open by gravity.

It will therefore be seen that by virtue of the above arrangement, we provide means for increasing the sensitiveness of the relay a predetermined time after the motor circuit has been closed, thus allowing a sufficient lapse of time for the initial rush of starting current to subside, and yet providing means for automatically opening the circuit in case of a subsequent excessive overload. It will be also noted that this increased sensitiveness is due to a change in the magnetic relation of the parts of the relay, the cores being moved farther within the influence of the solenoids. The degree of sensitiveness finally attained is determined by the position of the block 49 on the scale 48, it being thus possible to set the relay to operate at different current values as desired. By providing an overload coil and switch in each of a plurality of the motor leads, protection is afforded against short-circuit or overload occurring in one phase of the circuit but not another, as sometimes happens. In other words, excessive current in any of the three phases will cause the tripping of the main switch and the opening of the motor circuit.

It will be understood that while the device is usually so set that it does not respond to any ordinary starting current, still it is possible to so adjust the position of the block 50 as to cause the operation of the relay by an excessive or unusual starting current, such, for example, as might be caused by a complete short circuit. In other words, the block 50 may be adjusted so as to permit a normal starting of the motor but to open the circuit in case of a dangerously excessive starting current.

The arrangement shown in Fig. 4 is generally similar to that illustrated in Fig. 1, and the same reference characters have been used to designate corresponding parts. In this case, we have shown one side of the solenoid 15 connected to the wire 16 as in Fig. 1, and the other side connected through wires 21 and 25 with the lead 3 of the motor, the switch contacts 22 and 24 being interposed.

A rod 51, corresponding to the rod 31 in Fig. 1, is connected to the lower end of the spring 30 and coöperates with the dashpot D. In this case, however, the rod 51 has secured near its upper end a weighted collar 52. This collar is arranged to engage the curved ends 53 and 54 of levers 55 and 56, pivoted at 57 and 58 and provided with slots 59 and 60 adjacent their outer ends. In the slots 59 and 60, work cross-pins 61 and 62, carried by rods 63 and 64 working freely through brackets 65 and 66. The rods 63 and 64 are provided with enlarged heads adapted to engage the brackets 65 and 66 to limit the downward movement of the rods, and these rods terminate at their lower ends in screw-threaded stems 67 and 68, respectively. These stems enter screw-threaded sockets in cores 69 and 70 of magnetic material, which are associated with the solenoids 11 and 13, respectively. These cores 69 and 70 are adjustable on the screw-threaded stems 67 and 68 and can be held in adjusted position by means of lock nuts 71 and 72. The cores 69 and 70 are provided with scales 73 and 74, by means of which the degree of adjustment can be determined. These scales coöperate with the upper edges of the spools on which the coils 11 and 13 are wound.

In the lower ends of the solenoids 11 and 12 are mounted a second pair of cores 75 and 76, which carry switch disks 77 and 78, coöperating with contacts 22 and 24, respectively.

The operation is as follows. The air gap between the cores 69 and 75 and 70 and 76, respectively, is so great that the ordinary starting current through solenoids 11 and 13 is not sufficient to pick up the cores 75 and 76. The closing of the main switch, however, puts spring 30 under tension, which spring gradually pulls up the rod 51 as permitted by the dash-pot, thus projecting the cores 69 and 70 farther into the solenoids 11 and 13. In their final position, as determined by the engagement of the heads of the rods 63 and 64 with the brackets 65 and 66, the cores 69 and 70 are inserted in their respective solenoids to an extent indicated by the scale carried by each core. When so inserted, it will be seen that the air gap between the respective pairs of cores has been decreased to such an extent that a current through the solenoids of the strength indicated by the scale, will cause either or both of the cores 75 or 76 to pick up, thus opening the circuit of solenoid 15 and tripping the main switch. When the switch is opened and the tension on spring 30 relieved, the weight 52 serves to lift the solenoid cores 69 and 70 back to the position shown in the drawing.

In this case, as in Fig. 1, it will be observed that the sensitiveness of the overload device is increased a predetermined time after the closing of the main switch, so as to give the initial starting current time to subside, and that such increase in sensitiveness is due to a change in the magnetic relation of the parts of the device caused by a shifting of such parts. In this case, also, the final degree of sensitiveness attained may be adjusted and pre-set as desired.

What we claim is:

1. The combination with a switch, of electromagnetic operating means therefor, an overload relay controlling the circuit of said electromagnetic operating means, and means mechanically connected with and actuated by the movement of said switch for varying the sensitiveness of said relay a predetermined time after said switch is closed.

2. The combination with a switch, of electromagnetic operating means therefor, an overload relay controlling the circuit of said electromagnetic operating means, means mechanically connected with and actuated by said switch when closed, tending to move a part of said relay into a position to increase the sensitiveness thereof, and means for retarding such movement.

3. The combination with a switch, of electromagnetic operating means therefor, an overload relay controlling the circuit of said electromagnetic operating means, a spring connected with said switch and put under tension by the closing thereof, said spring serving, when under tension, to move a part of said relay to a position to increase the sensitiveness thereof, and means for retarding such movement.

4. The combination with a main switch, of electromagnetic operating means therefor, a manual pilot switch of the momentary contact type for closing the circuit of said electromagnetic operating means, said main switch having means to maintain the said circuit closed, an overload relay for opening said circuit, and means mechanically connected with and actuated by said main switch for varying the sensitiveness of said relay a predetermined time after the closing of said main switch.

5. In a motor control system, the combination with a switch controlling the main circuit of the motor, of an overload relay in said circuit, means mechanically connected with and operated by the closing of said switch tending to vary the magnetic relation of the parts of said relay to increase its sensitiveness, and means for retarding the movement of said first mentioned means during the normal period of acceleration of the motor.

6. In a motor control system, the combination with a switch controlling the main circuit of the motor, of an overload relay in said circuit, means mechanically operated by the closing of said switch for producing a relative movement of the parts of said relay to increase its sensitiveness, and means for preventing the completion of such movement until after the laps of sufficient time after the switch is closed to permit the initial rush of starting current to subside.

7. In a control system for polyphase electric motors, the combination with a switch controlling the supply of current to the motor, of a plurality of overload relays, each in a different phase of the motor circuit, means mechanically connected with and operated by the closing of said switch for simultaneously increasing the sensitiveness of all of said relays after said switch has been closed for a sufficient time to permit the initial rush of starting current to subside.

In testimony whereof we have affixed our signatures.

GEORGE H. WHITTINGHAM.
WILLIAM T. HOLMES.